United States Patent
McDanell et al.

(10) Patent No.: US 12,535,573 B2
(45) Date of Patent: Jan. 27, 2026

(54) INTERLEAVING RADAR RANGE AND DOPPLER PROCESSING

(71) Applicant: Aptiv Technologies AG, Schaffhausen (CH)

(72) Inventors: Roger McDanell, Carmel, IN (US); Purushothama TS, Bangalore (IN); Sankarganesh PB, Bangalore (IN); Gautham Kamath, Mangalore (IN)

(73) Assignee: Aptiv Technologies AG, Schaffhausen (CH)

( * ) Notice: Subject to any disclaimer, the term of this patent is extended or adjusted under 35 U.S.C. 154(b) by 289 days.

(21) Appl. No.: 17/660,008

(22) Filed: Apr. 20, 2022

(65) Prior Publication Data

US 2023/0213639 A1    Jul. 6, 2023

(30) Foreign Application Priority Data

Jan. 4, 2022    (IN) .............................. 202241000356

(51) Int. Cl.
  *G01S 13/532*    (2006.01)
  *G01S 7/288*    (2006.01)
  (Continued)

(52) U.S. Cl.
  CPC .......... *G01S 13/532* (2013.01); *G01S 7/2883* (2021.05); *G01S 13/5246* (2013.01); *G01S 13/931* (2013.01)

(58) Field of Classification Search
  None
  See application file for complete search history.

(56) References Cited

U.S. PATENT DOCUMENTS 4,888,739 A * 12/1989 Frederick .................. G06F 5/12
                                                                 365/236
2018/0172813 A1    6/2018 Rao et al.
(Continued)

FOREIGN PATENT DOCUMENTS

CN      113253243 A    8/2021
EP         3109662 A1 * 12/2016 ........... G01S 13/103
(Continued)

OTHER PUBLICATIONS

"Extended European Search Report", EP Application No. 22197377.9, May 4, 2023, 7 pages.
(Continued)

*Primary Examiner* — Robert W Hodge
*Assistant Examiner* — Brandon James Henson
(74) *Attorney, Agent, or Firm* — Harness, Dickey & Pierce, P.L.C.

(57) ABSTRACT

Described are techniques for interleaving range and Doppler radar processing. A data cube is memory accessed differently, from one look period to the next, which allows Doppler processing for a current look period to happen in parallel with range processing for a next look period. Range processing for a first look period writes to rows of the data cube; Doppler processing reads from and empties its columns. But before Doppler processing can finish, a second look period begins. Rather than re-writing to the rows, range processing in the second look period writes to the columns just emptied by the ongoing Doppler processing. Doppler processing for the first look period is allowed to finish by executing during processing idle times in the second period, e.g., in-between chirps. With better processor utilization, Doppler processing is afforded more time to do its complex operations, while keeping look periods as short as possible.

16 Claims, 8 Drawing Sheets

(51) Int. Cl.
G01S 13/524 (2006.01)
G01S 13/931 (2020.01)

(56) References Cited

U.S. PATENT DOCUMENTS

| | | |
|---|---|---|
| 2018/0231636 A1* | 8/2018 | Maher ................... G01S 13/06 |
| 2018/0231656 A1 | 8/2018 | Maher et al. |
| 2020/0132811 A1* | 4/2020 | Goswami ................ G01S 7/415 |
| 2020/0292662 A1 | 9/2020 | Boulanger |
| 2021/0241026 A1 | 8/2021 | Deng et al. |
| 2021/0278498 A1 | 9/2021 | Nayyar et al. |
| 2022/0276375 A1* | 9/2022 | Armstrong-Crews ...................... G01S 13/42 |
| 2023/0131090 A1* | 4/2023 | Li .......................... G01S 7/356 342/130 |

FOREIGN PATENT DOCUMENTS

| | | |
|---|---|---|
| GB | 2603476 A | 8/2022 |
| WO | 2020131337 A1 | 6/2020 |

OTHER PUBLICATIONS

First Office Action regarding Chinese Patent Application No. 202211710390.2, dated Jun. 25, 2025. Translation provided by SPTL LLC.

* cited by examiner

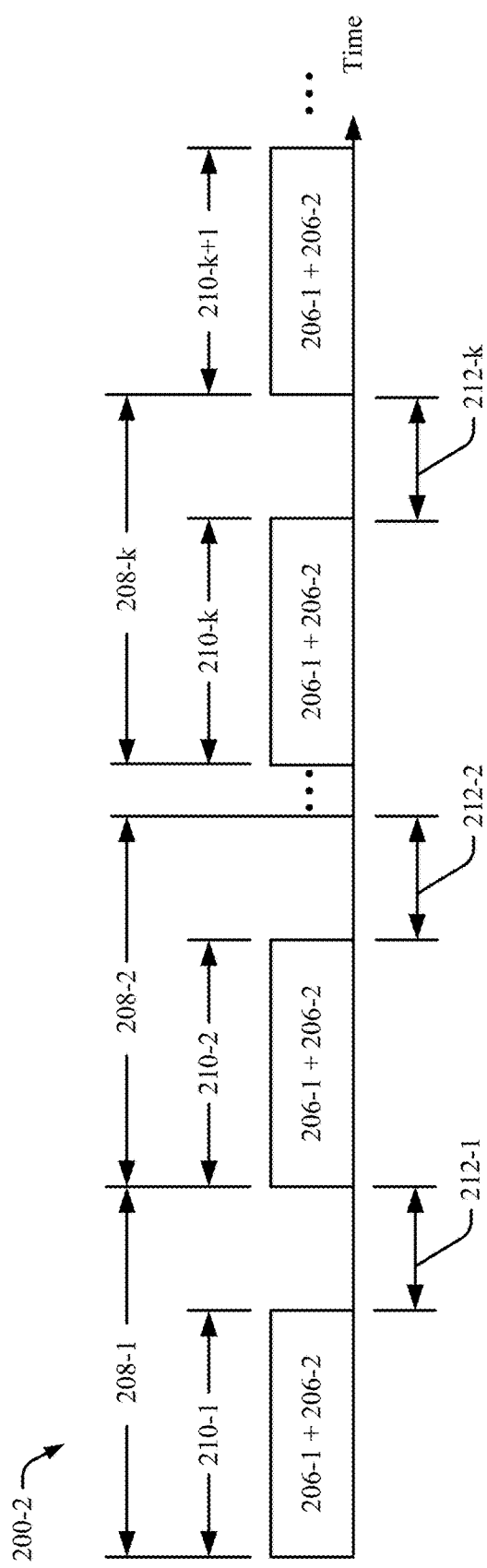
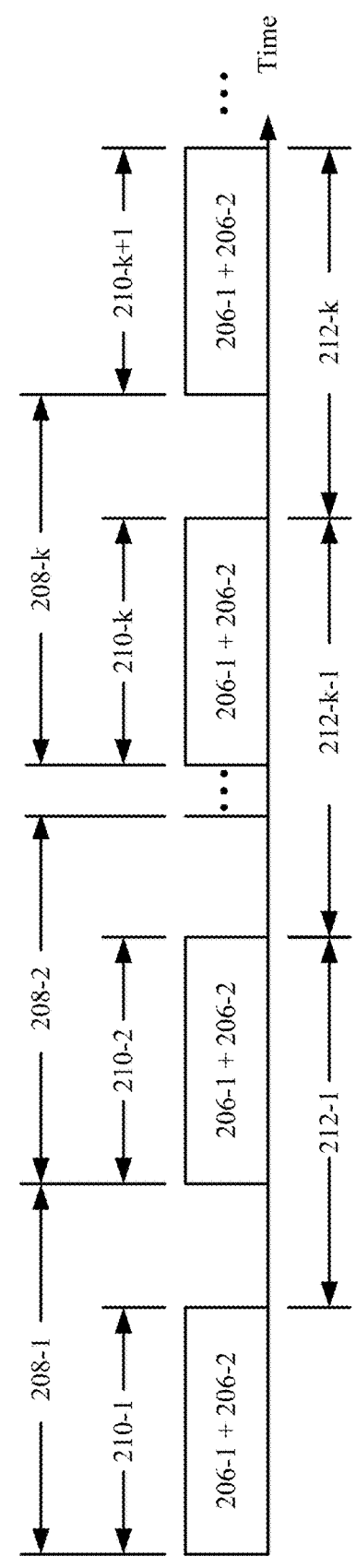
FIG. 2-2
FIG. 2-3

INTERLEAVING RADAR RANGE AND DOPPLER PROCESSING

CROSS-REFERENCE TO RELATED APPLICATION

This application claims priority to Indian Patent Application Number 202241000356, filed Jan. 4, 2022, the disclosure of which is hereby incorporated by reference in its entirety herein.

BACKGROUND

A common aspect involved in implementing look processing for Multiple-Input-Multiple-Output (MIMO) radar systems is to use a three dimensional data cube to store results derived from processing multiple samples of individual chirps on multiple channels. For each look period, the data cube can be stored in memory as a one-dimensional array; each cell is individually addressable using a unique combination of parameters indicative of range bin, chirp identity, and channel. Each look period includes two non-overlapping phases. A range processing phase fills the data cube with range Fast Fourier Transform (FFT) results for successive chirps by addressing rows of the data cube in memory. A Doppler processing phase retrieves the range FFT results for successive ranges by addressing columns of the data cube in memory. These transpose memory operations (e.g., reading columns of successive ranges after writing rows for successive chirps) delays Doppler processing until range processing is finished. This, as well as other factors, lead to an underutilization of processing resources and unnecessarily restricts Doppler processing to a small window of time, before range processing for a successive look period begins.

SUMMARY

This document describes techniques and systems for interleaving range and Doppler radar processing. In one example, a method includes maintaining, in a memory of a radar system, a data cube of sufficient size to store processed radar data for a single look period and obtaining multiple samples of radar returns corresponding to multiple chirps transmitted across multiple channels into an environment outside a vehicle. The method further includes performing, based on the multiple samples, range processing interleaved with Doppler processing by range processing the multiple samples for a current look period while finishing the Doppler processing for a previous look period, the Doppler processing for the previous look period finishing during processor idle times that occur between successive chirps of the current look period. The method further includes outputting, from the radar system, an indication of the data cube for use by a function of the vehicle.

These and other described techniques may be performed by hardware or a combination of hardware and software executing thereon. For example, a computer-readable storage media (CRM) may have instructions stored thereon and that when executed configure a processor to perform the described techniques. A system may include means for performing the described techniques. A processor or processor unit may be part of a system that is configured to execute the methods and techniques described herein.

Through implementation of these and other examples contemplated by this disclosure, fast and efficient radar range and Doppler processing can be achieved to estimate objects more accurately and/or quickly than from using traditional radar processing techniques, which condition Doppler processing on completion of range processing. This Summary introduces simplified concepts for interleaving range and Doppler radar processing, for example, vehicles (e.g., trucks, automobiles) equipped with radar or other components configured to interleave range and Doppler radar processing, as further made clear from the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of interleaving range and Doppler radar processing is described in this document with reference to the Drawings that may use same numbers to reference like features and components, and hyphenated numbers to designate variations of these like features and components. The Drawings are organized as follows:

FIG. 2-1 illustrates a timing diagram of example radar returns;

FIG. 2-2 illustrates a timing diagram for performing sequential range and Doppler radar processing of the radar returns from FIG. 2-1;

FIG. 2-3 illustrates a timing diagram for performing interleaving range and Doppler radar processing of the radar returns from FIG. 2-1;

FIG. 2-4 illustrates a conceptual diagram for writing and reading a data cube to a shared location of a CRM during the interleaving range and Doppler radar processing illustrated in FIG. 2-3;

FIG. 3 illustrates a flow diagram of an example process for interleaving range and Doppler radar processing;

FIG. 4 illustrates a flow diagram of enabling interleaving range and Doppler radar processing by range processing multiple samples while simultaneously performing Doppler processing.

DETAILED DESCRIPTION

Overview

An amount of memory needed to maintain a data cube, which stores range FFT results derived from processing multiple samples of successive chirps on multiple channels, can be large; a low cost radar system with less capable computing resources cannot afford to allocate large amounts of memory for preserving data cubes from one look period to the next, and often only maintain one data cube at a time. Because of how memory allocated for a data cube is addressed, range processing and Doppler processing traditionally occur sequentially, during non-overlapping phases. After range processing and addressing memory to fill rows of the data cube with range FFT results for successive chirps, the memory is accessed differently. Doppler processing retrieves the range FFT results for successive ranges by addressing columns of the data cube from the memory. These transpose memory operations cause Doppler processing to be delayed until range processing is finished.

In addition, traditional radar processing may underutilize computing resources. A chirping time can dominate a look period, in some cases, consuming more than half the time allocated for radar processing. During range processing, range FFT results for a chirp can be computed much faster than a chirping pulse repetition time. Range processing may keep a processor in an idle state while waiting for another chirp to arrive. Control over processing resources may only be relinquished after all range processing finishes, at which time, only a fraction of the look period is left for Doppler processing.

These, as well as other factors, unnecessarily restrict Doppler processing to a small window of time, before range processing for a successive look period begins. As more chirps are added to a radar waveform, this window becomes shorter. Look periods may need to be lengthened to allow Doppler processing to occur, which diminishes performance.

In contrast, described are techniques for interleaving range and Doppler radar processing. A data cube is memory accessed differently, from one look period to the next, which allows Doppler processing for a current look period to happen in parallel with range processing for a next look period. Range processing for a first look period writes to rows of the data cube; Doppler processing reads from and empties its columns. But before Doppler processing can finish, a second look period begins. Rather than re-writing to the rows, range processing in the second look period writes to the columns just emptied by the ongoing Doppler processing. Doppler processing for the first look period is allowed to finish by executing during processing idle times in the second period, e.g., in-between chirps. With better processor utilization, Doppler processing is afforded more time to do its complex operations, while keeping look periods as short as possible.

Example Environment

Figure 1:
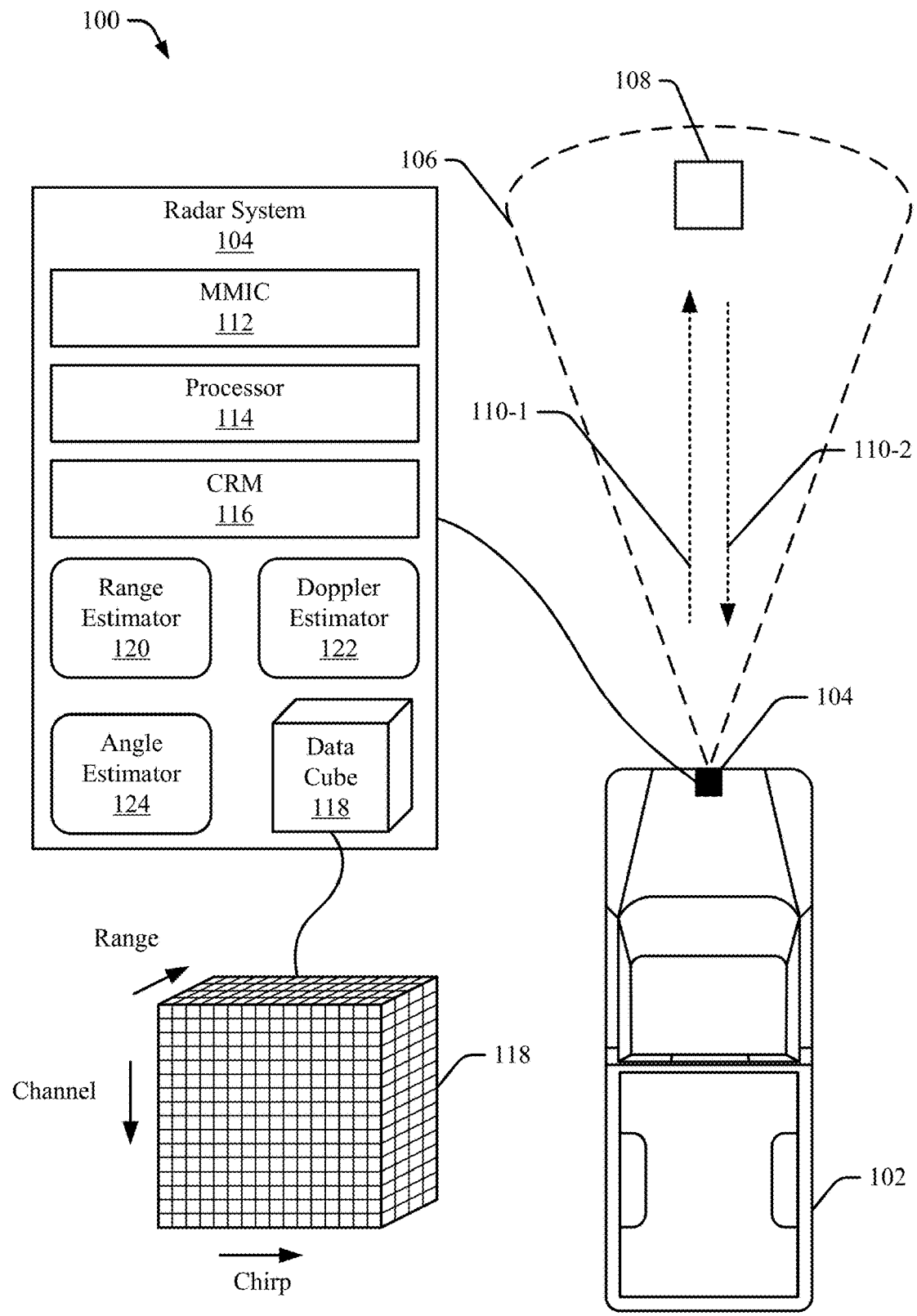
FIG. 1 illustrates an example environment for interleaving range and Doppler radar processing.

FIG. 1 illustrates an example environment 100 for interleaving range and Doppler radar processing, for example, by a vehicle 102. Although illustrated as a passenger truck, the vehicle 102 can represent other types of motorized vehicles (e.g., a car, motorcycle, bus, tractor, semi-trailer truck), non-motorized vehicles (e.g., a bicycle), railed vehicles (e.g., a train), watercraft (e.g., a boat), aircraft (e.g., an airplane), spacecraft (e.g., satellite), and the like. The depicted environment 100 includes the vehicle 102 traveling on a roadway.

The vehicle 102 is equipped with a radar system 104 for detecting an object 108 (or other like it) present on or near the roadway, which can impact how or whether the vehicle 102 can continue to travel. A region of interest associated with the radar system 104 at least partially surrounds the vehicle 102 and is referred to as a field of view 106 (also referred to as an instrumented field of view). Careful selection and/or positioning of components of the radar system 104 cause the field of view 106 to have a particular shape or size. Components of the radar system 104 can be installed on, mounted to, or integrated with any part of the vehicle 102, such as in a front, back, top, bottom, or side portion of the vehicle 102, a bumper, a side mirror, part of a headlight and/or taillight, or at any other interior or exterior location of the vehicle 102.

Although not shown, the vehicle 102 includes other vehicle systems that are operatively and/or communicatively coupled to the radar system 104 using wired and/or wireless links that act as interconnections, paths, or busses for vehicle components. These other vehicle systems use outputs from the radar system 104 to perform vehicle-based functions, which in addition to other functions may include functions for vehicle control. Any conceivable device, apparatus, assembly, module, component, subsystem, routine, circuit, processor, controller, or the like, can be configured as a vehicle system that uses radar data to act on behalf of the vehicle 102. As some non-limiting examples, the other vehicle systems may include a system for autonomous control, a system for safety, a system for localization, a system for vehicle-to-vehicle communication, a system for use as an occupant interface, and a system for use as a radar or multi-sensor tracker.

The radar system 104 includes a monolithic microwave integrated circuit (MMIC) 112, a processor 114, and a CRM 116. Through the MMIC 112, the processor 114 is operatively coupled to an interface of a multiple-input-multiple-output (MIMO) array (not shown). The MMIC 112, the processor 114, and/or the CRM 116 may be operatively and/or communicatively coupled via wired or wireless links (not shown), and may be part of a radar chip, which may be referred to as a system on chip. Other devices, antennas, and other radar components may be used by the radar system 104. The radar system 104 includes an antenna array, such as a multiple-input-multiple-output (MIMO) array capable of transmitting multiple chirps across a range of frequencies, on multiple channels.

The MMIC 112 accumulates radar data from the MIMO array on behalf of the processor 114. The radar data includes information about position and movement of objects in the field of view 106, such as positions and range-rates of radar detections that reflect off the object 108. The MMIC 112 receives instructions from the processor 114 to indicate characteristics (e.g., timing, phase, frequency range, channels) of radar signals 110-1 and their corresponding radar returns 110-2. The MMIC 112 causes the radar signals 110-1 to be transmitted via the MIMO array and into the environment 100 and then, causes the corresponding radar returns 110-2 to be received.

The processor 114 processes the radar data generated by the MMIC 112, and outputs the processed radar data in a form usable by the other vehicle systems of the vehicle 102. A data cube 118 is an example of processed radar data generated by the processor 114 from radar data obtained by the MMIC 112. The data cube 118 is generated from performing various functions, including interleaving range and Doppler radar processing, in accordance with the techniques of this disclosure. The processor 114 may include a controller, a control circuit, a microprocessor, its own chip, its own system, its own system-on-chip, a device, a processing unit, a digital signal processing unit, a graphics processing unit, or a central processing unit. The processor 114 may include multiple processors or cores, embedded memory storing executable software or firmware, internal/dedicated/secure cache or any other computer element that enables the processor 114 to execute machine-readable instructions for generating radar outputs.

In some examples, at least the CRM 116 and the processor 114 are a single component, such as an embedded system or system on chip. At least a portion of the CRM 116 is configured as a dedicated storage for the processor 114. The CRM 116 may include portions of storage (e.g., memory) reserved by the processor 114 to maintain the data cube 118 after interleaving range and Doppler radar processing. Access to the CRM 116 may be shared by other components of the radar system 104. The CRM 116 may also store machine-readable instructions for executing radar operations, including functions of a range estimator 120, a Doppler estimator 122, and an angle estimator 124. For purposes of this disclosure, the functions performed by the processor 114 are described primarily for generation of the data cube 118. It should be understood that generating the data cube 118 using interleaving of range and Doppler radar processing, can also lead to efficient performance of other radar based functions, including application of other functions to the data cube, localization, object detection, object classification, and/or object tracking. The data cube 118 and information (e.g., tracks) derived therefrom can be communicated from the radar system 104, to other vehicle systems of the vehicle 102 and/or other vehicles and systems. Communication of the data cube 118 within the radar system 104 is also possible to enable functions of other radar components (e.g., other processors, other circuits), which for simplicity of the drawings are not shown in FIG. 1.

In performing the functions of the range estimator 120, and the Doppler estimator 122, portions of the data cube 118 are written or read from the CRM 116. The range estimator 120 can cause the processor 114 to write to the CRM 116 to fill rows of the data cube 118 with range processing results. The Doppler estimator 122 can cause the processor 114 to empty portions of the data cube 118 by reading from the CRM 116 and utilize columns of the range processing results in performing Doppler processing. A unique addressing function is used by the processor 114 to manage access to the data cube 118 maintained at the CRM 116. With this addressing function the data cube 118 can be simultaneously filled and emptied to enable parallel writes to the data cube 118 with range processing results and reads from the data cube 118 of the range processing results to perform Doppler processing.

Consider the example shown in FIG. 1. The object 108 is in the travel path of the vehicle 102. The radar system 104 detects the object 108 and reports its position and movement by capturing radar data from a portion of the environment 100 that is captured by the field of view 106. For example, the processor 114 is operatively coupled to the MMIC 112 and an interface of the MIMO array. The processor 114 obtains radar data from the MMIC 112 including multiple samples of the radar returns 110-2 corresponding to multiple chirps transmitted across multiple channels into the environment 100 outside the vehicle 102.

Based on the multiple samples of the radar returns 110-2, the processor 114 calls on the range estimator 120 and the Doppler estimator 122 to perform range processing interleaved with Doppler processing. For example, the CRM 116 includes a portion of memory where the processor 114 maintains the data cube 118. The memory allocated to the data cube 118 is of sufficient size to store processed radar data for a single look period of the radar system 104. The range estimator 120 writes range results to the data cube 118 and the Doppler estimator 122 reads the range results from the data cube 118 to perform Doppler processing. Unlike traditional radar processing, however, the Doppler estimator 122 is not restricted to finishing the Doppler processing before a next look period begins. The range estimator 120 can range process the multiple samples for a current look period while the Doppler estimator 122 finishes the Doppler processing for a previous look period. The Doppler processing for the previous look period is allowed to finish during processor idle times of the processor 114, that occur between range processing, the range estimator 120, and successive chirps of the current look period. In other words, rather than retain control over the processor 114 during the entire range processing phase of a look period, the range estimator 120 relinquishes the processor 114 to the Doppler estimator 122 to finish Doppler processing for a previous look.

To do this, addressing the data cube 118 within the CRM 116 is carefully managed from one look period to the next. The processor 114 configures the range estimator 120 and the Doppler estimator 122 to alternate how the data cube 118 is filled and emptied, from one look period to the next. For example, a first look period includes the range estimator 120 writing range FFT results to the rows of the data cube 118, and further includes the Doppler estimator 122 reading the range FFT results from the columns of the data cube 118. Then, a subsequent look period includes the range estimator 120 writing the range FFT results to the columns of the data cube 118, instead of the rows. The Doppler estimator 122 reads the range FFT results from the rows of the data cube 118, instead of the columns.

In the end, the data cube 118 is used to infer estimates of range, Doppler, and (in response to the angle estimator 124 processing the radar data) angle for each of the detections identified from the radar data. The processor 114 is configured to output an indication of the data cube 118 (e.g., actual data or a pointer to the actual data stored at the CRM 116) for use by a function of the vehicle 102 or a function of the radar system 104. For example, the angle estimator 124 can use the data cube 118 to determine an angle or an angle of arrival for detections inferred from the data cube 118. The angle estimator 124 may access the channel dimension of the data cube 118, unlike during Doppler or range processing.

With Doppler processing allowed to continue into the subsequent look period, better overall hardware utilization is achieved by the processor 114, and the Doppler estimator 122 during is afforded more time to do its complex operations. In addition, not only is the processor 114 utilization improved, but memory utilization can also be kept in check even as more chirps are used; the described techniques for interleaving range and Doppler radar processing are compatible with low cost systems where storage allocated for radar processing is limited to portions of memory that can store only one data cube at a time.

Details of Interleaving Range and Doppler Processing

Figures 1, 2:
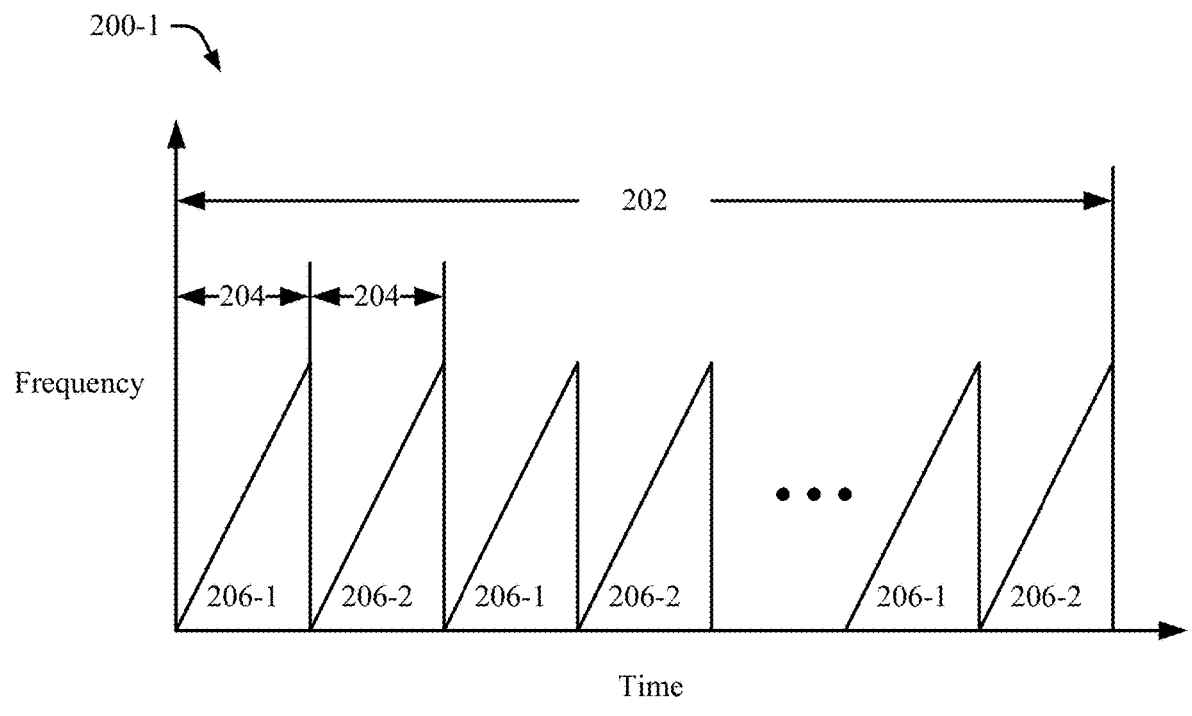

FIG. 2-1 illustrates a timing diagram 200-1 of example radar returns. The radar returns conveyed by the timing diagram 200-1 are an example of the radar returns 110-2. The radar signals 110-1 are transmitted during each look period. The radar returns 110-2 are obtained by the MMIC 112 as the radar signals 110-1 reflect back from objects in the field of view 106. In the example shown in FIG. 2-1, the radar returns 110-2 are sampled during each look period 202 to include, for each chirp interval 204, multiple samples of chirps 206-1 and 206-2 (collectively referred to as multiple chirps 206), across multiple channels (e.g., frequencies).

Figures 2, 3, 4:
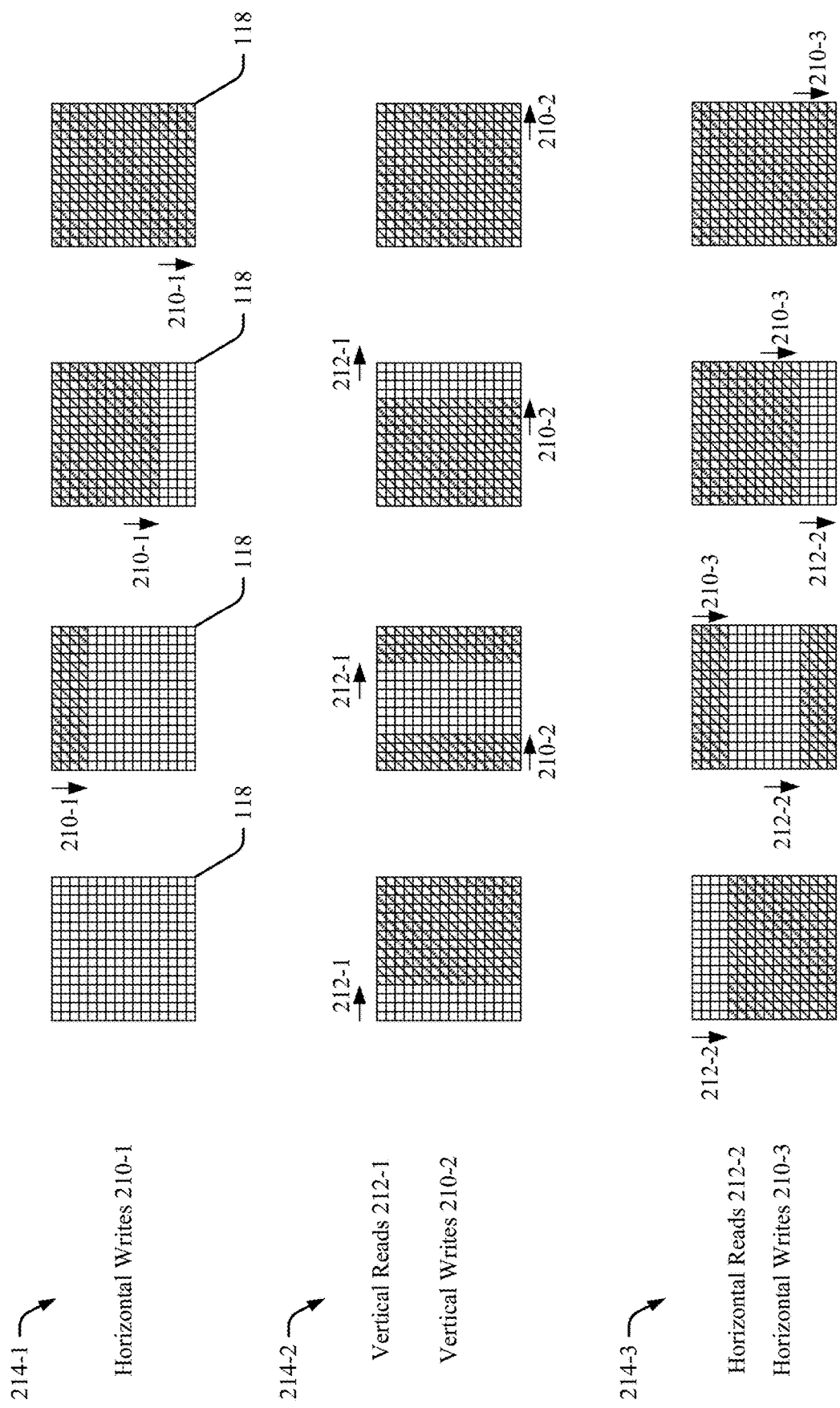
Figure 3:
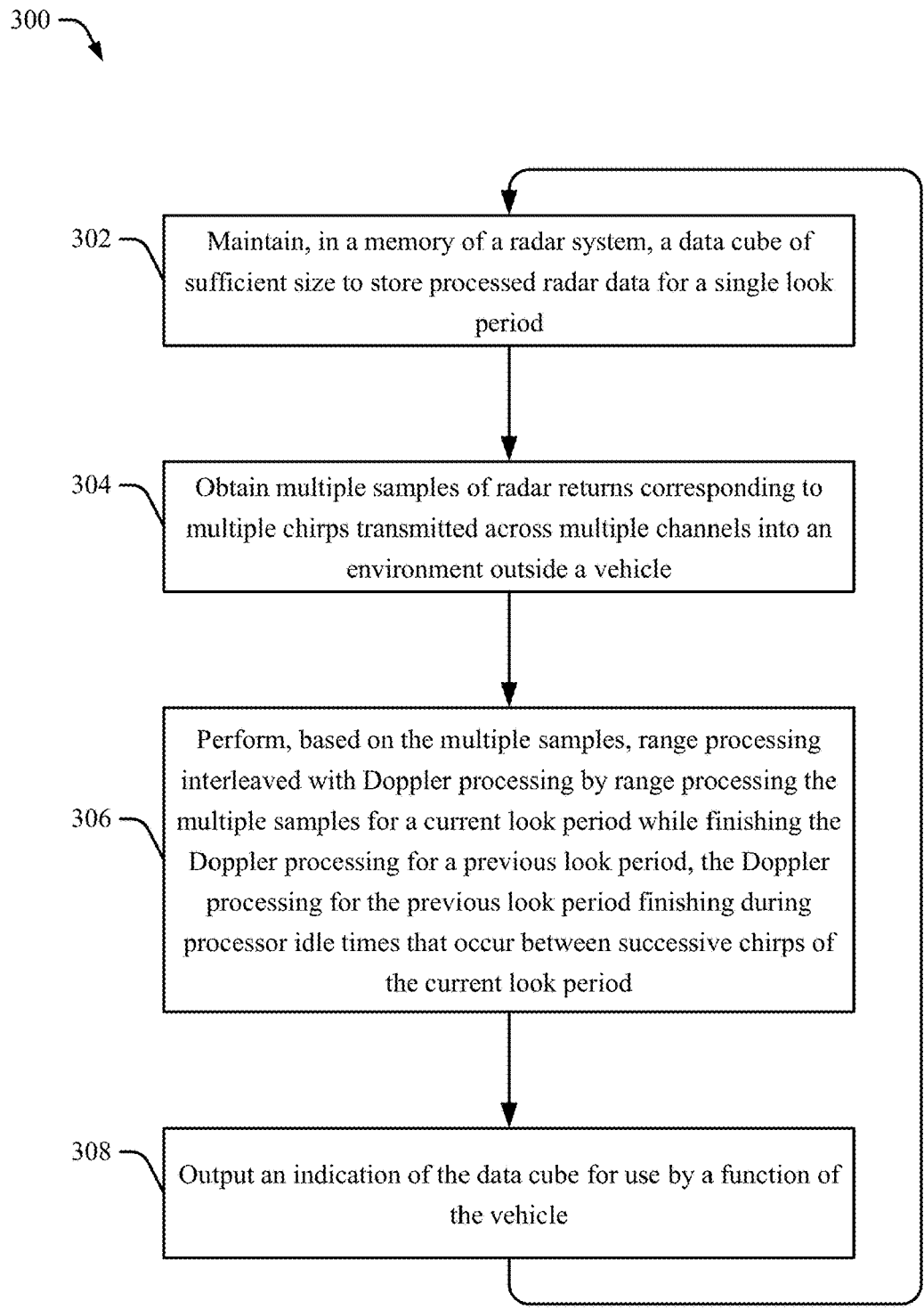
Figure 4:
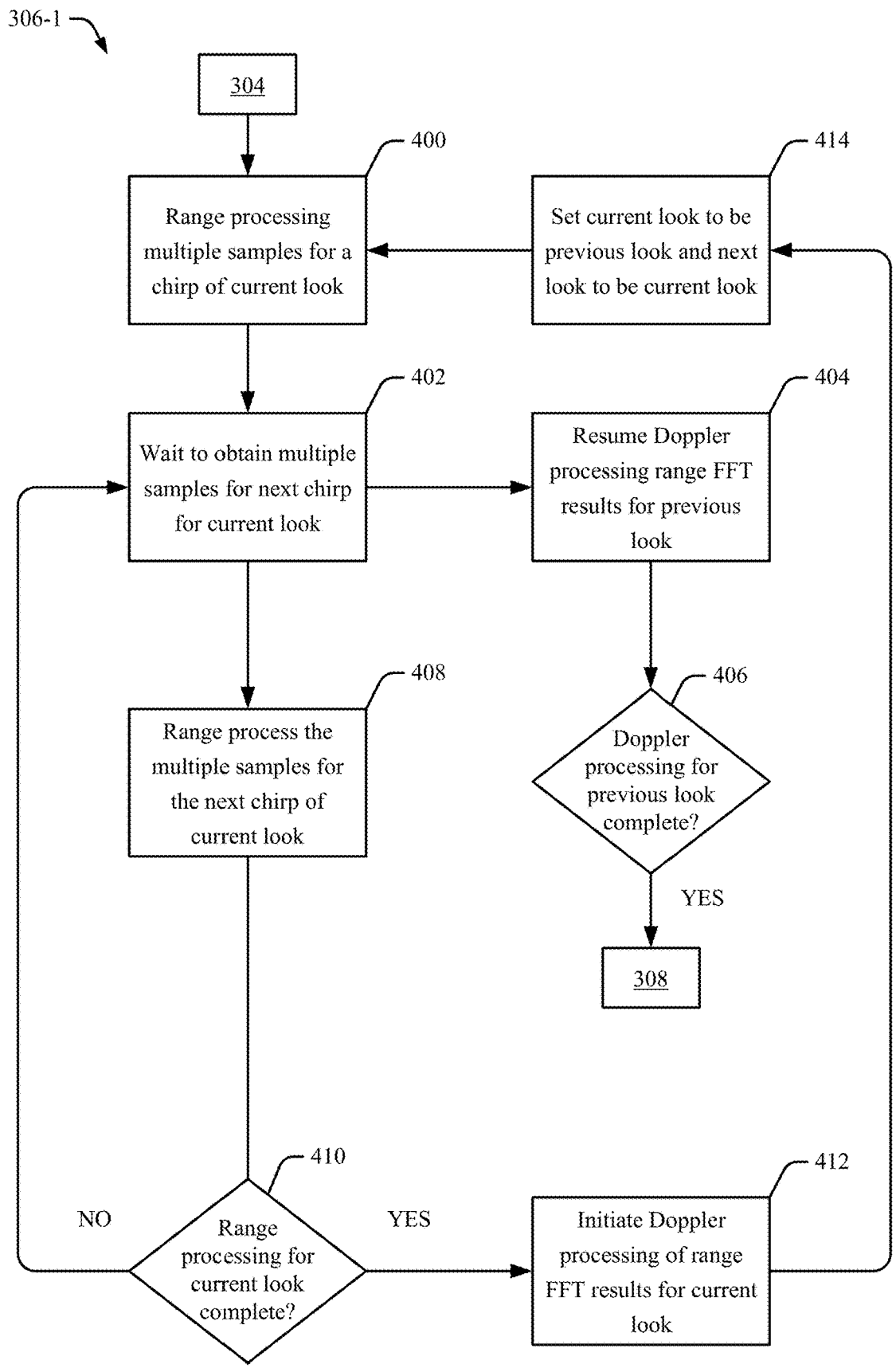

FIG. 2-2 illustrates a timing diagram 200-2 for performing sequential range and Doppler radar processing of the radar returns from FIG. 2-1. The timing diagram 200-2 represents a traditional way of radar processing the multiple samples of the multiple chirps 206. The multiple samples of the multiple chirps 206 are obtained from the MMIC 112 during two of the chirp intervals 204. The chirps 206 are sampled and processed for range, Doppler, and other estimates, during a radar processing phase 208-1, 208-2, ..., 208-$k$, which are referred to collectively as radar processing phases 208. Each of the radar processing phases 208 is temporally divided into two sequential periods: a range processing period 210-1, 210-2, ..., 210-$k$, which are referred to collectively as range processing periods 210, and a Doppler processing period 212-1, 212-2, ..., 212-$k$, which are referred to collectively as Doppler processing periods 212. In contrast to FIG. 2-3, FIG. 2-2 shows that the Doppler processing period 212-1 is not allowed to begin until the range processing period 210-1 completes. In this traditional example, the chirp intervals 204 and the range processing periods 210 consume more than half of the look period 202. But Doppler processing calculations require much more time than range processing calculations. It is desirable to allow each of the Doppler processing periods 212 to extend into the range processing periods 210 of subsequent look periods 202, during processor idle times.

This is not possible with traditional data cube storage and addressing schemes with no option for retaining multiple data cubes for buffering. Existing data cube addressing functions can organize the data cube 118 according to groups of range, chirp, and channel that are accessed at separate variable memory addresses. However, when using the same address mapping for each look period, the data cube 118 columns cannot be emptied until all the rows are filled. A next look period waits for Doppler processing to empty all columns before range processing can fill the rows again.

FIG. 2-3 illustrates a timing diagram 200-3 for performing interleaving range and Doppler radar processing of the radar returns from FIG. 2-1. In contrast to FIG. 2-2, FIG. 2-3 shows that the Doppler processing periods 212 are allowed to finish executing during processing idle times of the range processing periods 210 of subsequent look periods. Unlike traditional data cube storage and addressing schemes, the processor 114 is configured to process the radar returns 110-2 by filling and emptying the data cube 118 differently, from one look period to the next.

Per the timing diagram 200-3, the processor 114 is configured to perform range processing of a first chirp for a current look period, and while waiting for a second chirp for the current look period, the processor 114 is further configured to complete a portion of the Doppler processing for a previous look period. For example, during the range processing period 210-2, the Doppler processing period 212-1 for the previous look period is allowed to execute during processor idle times. The Doppler processing period 212-2 is initiated after the range processing period 210-2 is finished. Execution of the Doppler processing period 212-2 is allowed to continue into the range processing period 210-3, e.g., during processor idle times when waiting between two of the chirps 206.

In comparing the timing diagrams 200-2 and 200-3 side by side, the Doppler processing periods 212 of the traditional radar processing scheme are much shorter in duration than the Doppler processing periods 212 of the timing diagram 200-3, which shows better utilization of available computing resources to finish a complex task.

Doppler processing is not the only function that can be allowed to utilize idle processing time of each of the range processing periods 210. For example, the radar system 104 may apply other radar functions to the data cube 118 during the processor idle times that occur between successive chirps of a current look period. Some examples of these other functions can include angle estimation, interference mitigation, and the like. Programmable direct memory addressing (PDMA) operations are also supported during the processor idle times, to synchronize or otherwise enable output of the data cube 118 (e.g., to a data stream for use by other components of the radar system 104 and/or the vehicle 102).

Execution of other functions, including Doppler processing, during otherwise idle times during range processing, may be supported if certain conditions are satisfied. For example, a condition to range processing is that chirp data is available. A condition to Doppler processing is that range results for a particular group of ranges is available. Blocking operations that retain control of the processor 114 (e.g., during range processing) when waiting for data may not be permitted; time is not wasted waiting to test any of the conditions, and independent activities can continue.

Polling can be used to manage control of the processor 114 between range processing and Doppler processing. However, to achieve the above, the polling is set to occur at a minimum rate. This means that longer activities like Doppler processing are broken into small steps that can occur within time allowed by the minimum polling rate. After each step of the Doppler processing, control of the processor 114 is returned to a main polling loop to allow higher priority activities like range processing to occur in the middle of Doppler processing. The minimum polling rate is determined by real-time constraints like chirp pulse repetition period. This is required, for example, so that the MMIC 112 can process radar data before overwriting that radar data by later chirp data. Each activity (e.g., range processing, Doppler processing, PDMA operations) returns to the main polling loop when it is in a known state with its context (e.g., register values, variable values, program counter) saved. Other activities may occur before resuming an activity, but when the activity is resumed, the context is known.

FIG. 2-4 illustrates a conceptual diagram for writing and reading a data cube to a shared location of a CRM during the interleaving range and Doppler radar processing illustrated in FIG. 2-3. As mentioned in the previous section using a same memory map for the data cube 118 from one look period to the next does not allow a single data cube to be used in parallel both by range and Doppler processing without causing conflict between range processing writes to the rows and Doppler processing reads from the columns. To interleave range and Doppler processing, the processor 114 accesses the data cube 118 and the CRM 116 using two separate address mapping functions for successive looks, which prevents row and column conflicts.

FIG. 2-4 shows the data cube 118 in different example scenarios 214-1 to 214-3. For simplicity of the drawings, the channel dimension of the data cube 118 is not shown. In each of these, the CRM 116 is accessed during interleaved range and Doppler processing to write to the data cube 118 or read from the data cube 118. Each of the cross-hatch shaded cells is filled with range FFT results, and each non-shaded cell is empty. In this example, a horizontal read or write works linearly across a row of the data cube 118, then down to a next row. A vertical read or write to the data cube 118 fills with jumps down a column, then right to a next column Referring to the scenario 214-1, the range processing period 210-1 may include the range estimator 120 causing each row of the data cube 118 to be filled (e.g., in a sequential order). As soon as the range processing period 210-1 is finished, the Doppler processing period 212-1 can begin with the Doppler estimator 122 reading from columns of the data cube 118.

The scenario 214-2 shows the Doppler estimator 122 emptying columns of the data cube 118 during the Doppler processing period 212-1. The Doppler processing period 212-1 is interleaved with the range processing period 212-2, and to maximize processor utilization before a subsequent look period, is initiated as soon as the range processing period 210-1 finishes. A portion of the data cube 118 is emptied in response to initiating the Doppler processing period 212-1, before a subsequent look period and subsequent range processing period can begin. For example, this portion of the data cube 118 may be less than half of the data cube size (e.g., several columns, a quarter of the columns) or at least half of the data cube size (e.g., two thirds of the columns).

To prevent conflicts between the Doppler processing period 212-2 and subsequent range processing periods that follow, an alternating write and read scheme is used by the processor 114 to manage access to the data cube 118 from one look period to the next. The Doppler processing period 212-1 is allowed to empty range FFT results from columns of the data cube 118 during processor idle times (e.g., between chirps), when the range processing period 210-2 is waiting for new radar data from the MMIC 112 for a current look period. The Doppler processing period 212-1 finishes executing during one or more idle processor times, before the range processing period 210-2 finishes.

In the scenario 214-2, the Doppler processing period 212-2 is initiated as soon as the range processing period 210-2 finishes to maximize processor utilization and further prevent conflicts. Instead of reading columns, the Doppler processing period 212-1 includes reading range FFT results from columns of the data cube 118. During a next look period, range processing period 210-3 can begin by filling the rows of the data cube 118, similar to the scenario 214-2. After the data cube 118 is filled with rows of range FFT results, the above process is repeated similar for all subsequent look periods by Doppler processing columns and then writing range FFT results to columns instead of rows.

Process Utilizing Interleaved Range and Doppler Radar Processing

FIG. 3 illustrates a flow diagram of an example process 300 for interleaving range and Doppler radar processing. For ease of description, the process 300 is described primarily in the context of being performed by the radar systems 104 using the processor 114 with access to the CRM 116. For example, the range estimator 120 can write to portions of the CRM 116 to fill the data cube 118. When executed in parallel with the range estimator 120, the Doppler estimator 122 can read from portions of the CRM 116 to empty the data cube 118. Operations (also referred to as steps) of the process 300 are numbered in this example from 302 to 308. However, this numbering does not necessarily imply a specific order of operations. The steps of the process 300 may be rearranged, skipped, repeated, or performed in different ways than the specific way it is shown in the diagram of FIG. 3.

At step 302, a data cube of sufficient size to store processed radar data for a single look period is maintained in a memory of a radar system. For example, the processor 114 allocates a portion of the CRM 116 as the data cube 118 to store range FFT results from the range estimator 120 as the range estimator 120 fills and writes to the data cube 118.

At 304, multiple samples of radar returns corresponding to multiple chirps transmitted across multiple channels into an environment outside a vehicle are obtained. For example, the MMIC 112 obtains radar data corresponding to the radar returns 110-2 that reflect off objects in the field of view 106. The processor 114 obtains the radar data from the MMIC 112 to process the radar data into the data cube 118.

At 306, based on the multiple samples, range processing interleaved with Doppler processing is performed by range processing the multiple samples for a current look period while finishing the Doppler processing for a previous look period. The Doppler processing for the previous look period finishes during processor idle times that occur between successive chirps of the current look period.

The processor 114 can accomplish interleaving range and Doppler processing by following an alternating read and write scheme that is different than traditional radar processing. For each look period, the processor 114 may alternate between:
1) Executing range processing the multiple samples for that look period by writing range FFT results to the rows of the data cube and performing Doppler processing the multiple samples for that look period by reading the range FFT results from the columns of the data cube; and
2) Performing range processing the multiple samples for that look period by writing the range FFT results to the columns of the data cube and executing Doppler processing the multiple samples for that look period by reading the range FFT results from the rows of the data cube.

For example, during a current look period, rows of data cube 118 are filled with range FFT results. After the data cube 118 is filled for the current look period, Doppler processing can take over and columns of the data cube 118 are emptied by the Doppler estimator 122. During a next look period, the range estimator 120 fills empty columns of the data cube 118, which from the Doppler processing, are emptied by the Doppler estimator 122. The range estimator 120 is prevented from filling the columns of the data cube 118 until sufficient Doppler processing occurs, and at least a portion of the data cube 118 is empty. For example, the range estimator 120 may delay writing range FFT results for a current look period until the Doppler estimator 122 is far enough along in Doppler processing the previous look period range FFT results to prevent collisions between the range estimator 120 and the Doppler estimator 122 trying to read and write to a same column. For a next look period, the Doppler processing reads from the rows of the data cube 118, and range processing for a subsequent look period alternates back to writing to the rows of the data cube 118 having been emptied by the Doppler estimator 122. Further details of step 306 are described in context of the process shown in FIG. 4.

At step 308, an indication of the data cube is output by the radar system for use by a function of the vehicle. For example, the radar system 104 outputs an indication of the data cube 118 including range and Doppler estimates for potential objects in the environment 100.

Example Process for Interleaving Range and Doppler Radar Processing

FIG. 4 illustrates a flow diagram of a process 306-1 for enabling interleaving range and Doppler radar processing by range processing multiple samples while simultaneously performing Doppler processing. The process 306-1 is an example of the step 306 from the process 306-1. For example, the radar system 104 uses the processor 114 with access to the CRM 116 to perform the step 306, for filling and emptying the data cube 118 using interleaving range and Doppler processing. The steps of the process 306-1 are numbered, however, like with the process 306-1, this numbering does not necessarily imply a specific order of operations. The steps of the process 306-1 may be rearranged, skipped, repeated, or performed in different ways than the specific way it is shown in the diagram of FIG. 4.

Consider an example where range processing for a previous look period has already occurred, which causes the range estimator 120 to fill each row of the data cube 118 with range FFT results. Then, with the data cube 118 filled, the Doppler estimator 122 can begin emptying the data cube 118, one column at a time. The Doppler estimator 122 initiates Doppler processing for the previous look period, by reading columns of the data cube 118.

At step 400, multiple samples for a current look period are range processed for a current chirp. For example, instead of writing to a row like the previous look period, the range estimator 120 writes a column of range FFT results for each chirp.

At step 402, the process 306-1 waits to obtain multiple samples for a next chirp for the current look period. For instance, while the range estimator 120 is waiting for additional radar data from the MMIC 112, the range estimator 120 relinquishes control of the processor 114 so other processes can execute thereon.

At 404, while waiting for the next chirp, whether Doppler processing for the previous look period is complete is determined. For example, the Doppler estimator 122 determines whether it is finished processing the range FFT results for an entire look period of range FFT results. If not, then the process 306-1 can enter step 406 to finish Doppler processing.

At step 406, Doppler processing range FFT results for the previous look period resumes. The Doppler estimator 122 obtains control over the processor 114 and finishes reading one row of the data cube 118 at a time to finish Doppler processing for a previous look period, before the range estimator 120 can fill the empty rows with range FFT results for the current look period. In this way, the radar system 104 can complete a portion of the Doppler processing for the previous look period, while waiting between chirps of a current look period. The Doppler estimator 122 benefits from otherwise idle times of the processor 114 that can occur with other radar systems, where a range estimator is allowed to retain control over a processor until all range processing is finished.

At step 408, multiple samples for the current look period are range processed for the next chirp. For example, the range estimator 120 continues range processing for the current look period by writing range FFT results for the next chirp to another column of the data cube 118.

At 410, whether range processing for the current look period is complete is determined. For example, the range estimator 120 determines whether it is finished filling the columns of the data cube 118 with range FFT results for the current look period. If the range processing is not complete, the process 306-1 returns to step 402 to wait for another chirp of the current look period. Steps 404, 406, and 408 are repeated in response.

At 412, when the range processing for the current look period is finished, Doppler processing the range FFT results for the current look period can initiate. For example, because the data cube 118 is written with range FFT results column by column, the Doppler estimator 122 reads from rows of the data cube 118 to Doppler process the range FFT results for different ranges.

At 414, before the Doppler processing at step 412 finishes, the current look period is set to be the previous look period and a next look period is set to be the current look period. Then the process 306-1 repeats starting at step 400, for the new current look period.

Address Mappings for Interleaving Range and Doppler Radar Processing

Figure 5:
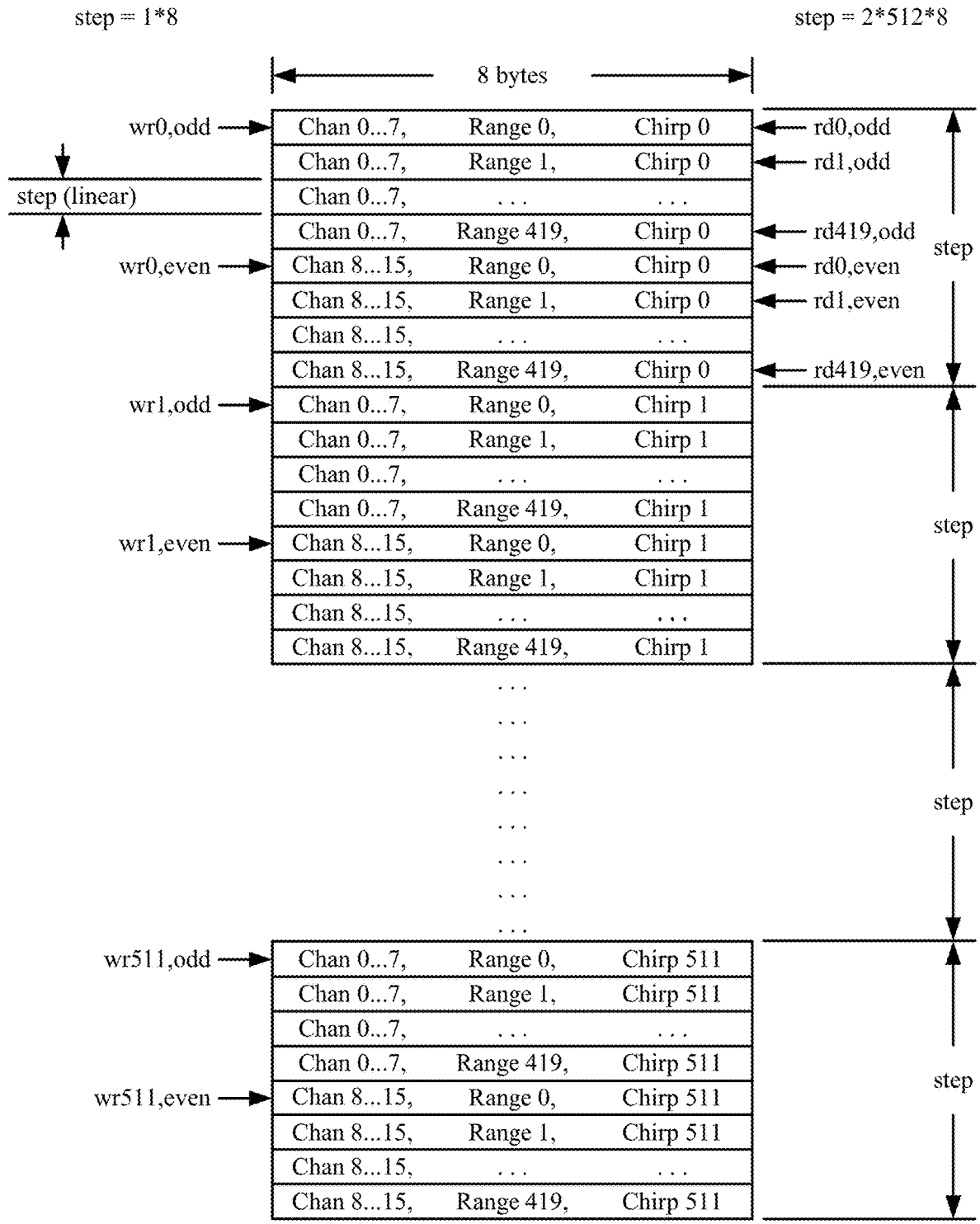
FIGS. 5 and 6 illustrates conceptual diagrams of example memory accesses for interleaving range and Doppler radar processing.
Figure 6:
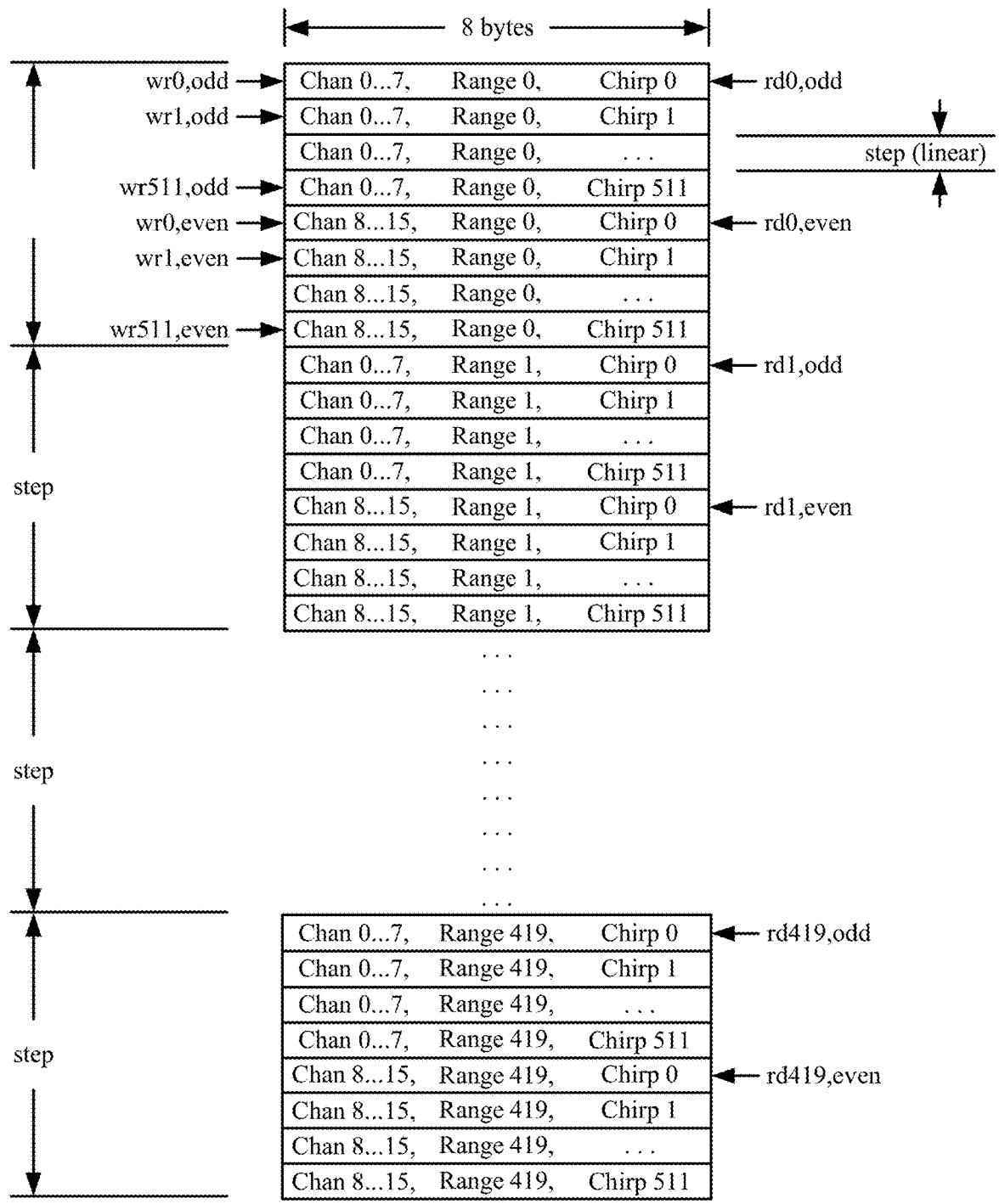

FIGS. 5 and 6 illustrates conceptual diagrams of example memory accesses for interleaving range and Doppler radar processing. The FIGS. 5 and 6 show the mappings of range, chirp and odd and even channel groups, mapped to physical addresses and memory for two memory maps. Use of odd and even chirps is not required. This is just an example for the use case of eight receive channels, four hundred twenty range bins, and one thousand twenty four chirps (e.g., five hundred twelve odd chirps and five hundred twelve even chirps).

As mentioned previously, the processor 114 can utilize several variables in address mapping to portions (e.g., rows or columns of cells) of the data cube 118. A variable involved in address mappings includes chirp quantity, which is a total number of chirps in a look period, and must be a power of two (e.g., five hundred twelve). Another variable for address mappings includes channel group quantity, which is a total number of channel groups (e.g., two for odd and even chirps). A third variable is a quantity of channels per channel group (e.g., one, multiple channels compressed together), and a fourth variable used in addressing mappings includes a quantity of range bins used (e.g., four hundred twenty, may be less than ranges given by range FFT results). A last variable used for address mappings includes a number of possible ranges from the range FFT results (e.g., five hundred twelve), and must be a power of two. The quantity of range bins used may be different than the number of possible ranges. The first is the number of ranges written in range processing and the number of ranges processed in Doppler processing. The second is also a power of two and is used to calculate starting addresses during range and Doppler processing.

As such, address mappings can be defined using spans of bits or bytes of memory (e.g., the CRM 116) depending on which chirp, group, range, and channel. Consider the examples of FIGS. 5 and 6; the address mappings alternate between a first address mapping for range processing rows and Doppler processing columns, and a second address mapping for range processing columns and Doppler processing rows.

For the first address mapping, the processor 114 accesses the data cube 118 stored by the CRM 116 using an addressing function that arranges cells of the data cube 118 according to chirp, group, and range. A first sum is used, including a chirp number (e.g., unique number for each in the chirp quantity) multiplied by the channel group quantity and added to a group number (e.g., a unique number for each channel group). This first sum is multiplied by the number of possible ranges and added to a range number (e.g., unique for each range bin) to derive a second sum. The second sum is multiplied by a third sum of the channels per channel group and a channel number (e.g., unique number for each possible channel). Range processing steps to a next address by increasing the address by the quantity of channels per group. Doppler processing steps through addresses by increasing the address by steps corresponding to a product of the quantity of channels per group, the number of possible ranges, and the quantity of channels per channel group.

For the second address mapping, the processor 114 accesses the data cube 118 stored by the CRM 116 using a different addressing function that arranges cells of the data cube 118 according to chirp, group, and range. A first sum is used, including a range number multiplied by a channel group quantity added to a group number. The first sum is multiplied by the chirp quantity and added to the chirp number to generate a second sum. The second sum is multiplied by a third sum of the quantity of channels per group and the channel number.

Range processing steps through addresses by increasing the address by steps corresponding to a product of the quantity of channels per group, the number of possible ranges, and the quantity of channels per channel group. Doppler processing steps to a next address by increasing the address by the quantity of channels per group.

As such, the 'range' and 'chirp' variables swap roles in the different address mappings. Other address mapping schemes may be used, so long as they define address mappings that are consistent with the characteristic transpose that happens between range and Doppler processing. This allows range processing to fill locations of the data cube 118 that Doppler processing is emptying. The quantity of chirps can be the same or different than the number of possible ranges, or they may be the same. For example, range processing may fill two chirps worth of range FFT results to the data cube 118 after Doppler processing empties only one range bin worth of range FFT results.

To this end, an efficient way of handling processor idle time and memory usage allows the radar system 104 to include more complex signal processing routines like interference mitigation, coherent integration, and the like, within the time budget allocated to a look period. For example, with Doppler processing allowed to continue into a next look period, time for interference mitigation is afforded, before the range FFT results are written. In addition, similar to Doppler processing, the angle estimator 124 can estimate angles or directions of arrival based on the data cube 118 during processing idle times of a subsequent look. This may allow key performance index values for the radar system 104, like quantity of chirps, quantity of samples, quantity of possible range bins, and detection count to be increased significantly to meet different applications without increasing memory or computing resources. This concept is portable to different radar variants, enabling reuse for current and future generation of radars. In fact, a radar's computational capability to process more radar data with the same number of resources compared to previous radar designs is improved. In some cases, without this range Doppler interleaving approach, it may not be feasible to implement radar processing on an automobile or other cost sensitive application.

FURTHER EXAMPLES

Some additional examples for interleaving range and Doppler radar processing are provided below.

Example 1: A method comprising: maintaining, in a memory of a radar system, a data cube of sufficient size to store processed radar data for a single look period; obtaining multiple samples of radar returns corresponding to multiple chirps transmitted across multiple channels into an environment outside a vehicle; performing, based on the multiple samples, range processing interleaved with Doppler processing by range processing the multiple samples for a current look period while finishing the Doppler processing for a previous look period, the Doppler processing for the previous look period finishing during processor idle times that occur between successive chirps of the current look period; and outputting, from the radar system, an indication of the data cube for use by a function of the vehicle.

Example 2: The method of any preceding example, wherein the data cube comprises rows and columns, and performing range processing interleaved with Doppler processing based on the multiple samples comprises, for each look period, alternating between: range processing the multiple samples for that look period by writing range FFT results to the rows of the data cube and Doppler processing the multiple samples for that look period by reading the range FFT results from the columns of the data cube; and range processing the multiple samples for that look period by writing the range FFT results to the columns of the data cube and Doppler processing the multiple samples for that look period by reading the range FFT results from the rows of the data cube.

Example 3: The method of any preceding example, wherein performing range processing interleaved with Doppler processing based on the multiple samples comprises: initiating, during the previous look period, Doppler processing of the multiple samples for the previous look period in response to range processing the multiple samples for the previous look period.

Example 4: The method of any preceding example, further comprising: applying other radar functions to the data cube during the processor idle times that occur between successive chirps of the current look period.

Example 5: The method of any preceding example, wherein applying other radar functions to the data cube comprises estimating angles or angle of arrivals from the data cube.

Example 6: The method of any preceding example, wherein range processing the multiple samples for a current look period while finishing the Doppler processing for a previous look period comprises: range processing a first chirp for the current look period; and while waiting for a second chirp for the current look period, completing a portion of the Doppler processing for the previous look period.

Example 7: The method of any preceding example, further comprising: emptying a portion of the data cube in response to initiating the Doppler processing for the previous look period; and filling the data cube starting with the empty portion in response to range processing the multiple samples for the current look period.

Example 8: The method of any preceding example, wherein the portion of the data cube comprise less than half of the data cube.

Example 9: The method of any preceding example, wherein the portion of the data cube comprise at least half of the data cube.

Example 10: The method of any preceding example, wherein range processing the multiple samples for a current look period while finishing the Doppler processing for a previous look period comprises: writing, to an order of rows of the data cube, range processing results for the previous look period; reading, from an order of columns of the data cube, the range processing results for the previous look period to initiate Doppler processing for the previous look period; writing, to the order of columns of the data cube, range processing results for the current look period; and reading, from the order of rows of the data cube, the range processing results for the current look period to initiate Doppler processing for the current look period.

Example 11: The method of any preceding example, further comprising: range processing the multiple samples for a next look period while finishing the Doppler processing for the current look period.

Example 12: A system comprising: a memory; an interface of a multiple-input-multiple-output (MIMO) array; and a processor operatively coupled to the interface of the MIMO array and configured to perform the method of any preceding example.

Example 13: A computer-readable storage media comprising instructions that, when executed, cause a processor of a radar system to perform the method of any preceding example.

Example 14: A system comprising means for performing the method of any preceding example.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. In addition to radar systems, problems associated with performing track associations at least partially based on low confidence detections can occur in other systems (e.g., image systems, lidar systems, ultrasonic systems) that identify and process tracks from a variety of sensors. Therefore, although described to improve radar tracking, the techniques of the foregoing description can be adapted and applied to other problems to effectively detect and track objects in a scene using other types of object trackers.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

We claim:

1. A radar system comprising:
   a memory;
   an interface of a multiple-input-multiple-output (MIMO) array; and
   a processor operatively coupled to the interface of the MIMO array and configured to:
   maintain, in the memory,
   a data cube of sufficient size to store processed radar data for a single look period; perform, during a first look period, the following steps:
   receive a first plurality of samples of radar returns corresponding to a first plurality of chirps transmitted across multiple channels into an environment outside a vehicle;
   perform range processing by determining a first range result for each sample of the first plurality of samples of radar returns by performing a Fast Fourier Transform (FFT) on each sample;
   write the first plurality of range results for each sample of the first plurality of samples of radar returns to the data cube, wherein the processor writes each range result to the data cube horizontally; and
   perform Doppler processing by reading, in response to completing the writing step for each sample of the first plurality of samples of radar returns, a portion of the first plurality of range results written to the data cube comprising less than half of the data cube, wherein a Doppler processor reads the first plurality of range results in the data cube vertically and empties the range results from the data cube after they are read;
   perform during a second look period following the first look period, the following steps:
   determine that a predetermined threshold percentage of the data cube has been emptied;
   receive a second plurality of samples of radar returns corresponding to a second plurality of chirps transmitted across multiple channels into an environment outside the vehicle, wherein the reception of each sample of the second plurality is followed by a waiting period during which samples are not received;
   perform range processing by determining, in response to determining that the predetermined threshold percentage has been reached, a second range result for each sample of the second plurality of samples of radar returns by performing FFT on each sample;
   write, beginning with the empty portion of the data cube, the second plurality of range results for each sample of the second plurality of samples of radar returns to the data cube, wherein the processor writes each range result to the data cube vertically; and
   perform Doppler processing by reading, during the waiting period between samples, the remaining portion of the first plurality of range results written to the data cube, wherein the Doppler processor continues to read the remainder of the first plurality of range results in the data cube vertically and empties the range results from the data cube after they are read; and output an indication of the data cube for use by a function of the vehicle.

2. The system of claim 1, the processor further configured to:
   perform, during a third look period following the second look period, the following steps:
   determine that the predetermined threshold percentage of the data cube is empty;
   receive a third plurality of samples of radar returns corresponding to a third plurality of chirps transmitted across multiple channels into an environment outside the vehicle, wherein the reception of each sample of the third plurality is followed by a waiting period during which samples are not received;
   determine, in response to determining that the predetermined threshold percentage has been reached, a third range result for each sample of the third plurality of samples of radar returns by performing FFT on each sample;
   write, beginning with the empty portion of the data cube, the third plurality of range results for each sample of the second plurality of samples of radar returns to the data cube, wherein the processor writes each range result to the data cube horizontally; and
   read, during the waiting period between samples, the remaining portion of the second plurality of range results written to the data cube, wherein the processor continues to read the remainder of the second plurality of range results in the data cube horizontally and empties the range results from the data cube after they are read.

3. The system of claim 2, the processor further configured to perform the steps performed during the first look period and the second look period for each successive look period in an alternating fashion.

4. The system of claim 2, the processor further configured to perform the steps performed during the second look period and the third look period for each successive look period in an alternating fashion.

5. A non-transitory computer-readable storage media comprising instructions that, when executed, cause a processor of a radar system to:
maintain, in a memory of the radar system,
a data cube of sufficient size to store processed radar data for a single look period; perform, during a first look period, the following steps:
receive a first plurality of samples of radar returns corresponding to a first plurality of chirps transmitted across multiple channels into an environment outside a vehicle;
perform range processing by determining a first range result for each sample of the first plurality of samples of radar returns by performing a Fast Fourier Transform (FFT) on each sample;
write the first plurality of range results for each sample of the first plurality of samples of radar returns to the data cube, wherein the processor writes each range result to the data cube horizontally; and
perform Doppler processing by reading, in response to completing the writing step for each sample of the first plurality of samples of radar returns, a portion of the first plurality of range results written to the data cube comprising less than half of the data cube, wherein a Doppler processor reads the first plurality of range results in the data cube vertically and empties the range results from the data cube after they are read;
perform during a second look period following the first look period, the following steps:
determine that a predetermined threshold percentage of the data cube has been emptied;
receive a second plurality of samples of radar returns corresponding to a second plurality of chirps transmitted across multiple channels into an environment outside the vehicle, wherein the reception of each sample of the second plurality is followed by a waiting period during which samples are not received;
perform range processing by determining, in response to determining that the predetermined threshold percentage has been reached, a second range result for each sample of the second plurality of samples of radar returns by performing FFT on each sample;
write, beginning with the empty portion of the data cube, the second plurality of range results for each sample of the second plurality of samples of radar returns to the data cube, wherein the processor writes each range result to the data cube vertically; and
read, during the waiting period between samples, the remaining portion of the first plurality of range results written to the data cube, wherein the Doppler processor continues to read the remainder of the first plurality of range results in the data cube vertically and empties the range results from the data cube after they are read; and output an indication of the data cube for use by a function of the vehicle.

6. The non-transitory computer-readable storage media of claim 5, wherein the instructions, when executed, further cause the processor to:
apply other radar functions to the data cube during the waiting period between samples when the radar system is not receiving samples.

7. The non-transitory computer-readable storage media of claim 6, wherein the instructions, when executed, cause the processor to apply other radar functions to the data cube by estimating angles or angle of arrivals from the data cube.

8. The non-transitory computer-readable storage media of claim 5, wherein the instructions, when executed, further cause the processor to:
perform, during a third look period following the second look period, the following steps:
determine that the predetermined threshold percentage of the data cube is empty;
receive a third plurality of samples of radar returns corresponding to a third plurality of chirps transmitted across multiple channels into an environment outside the vehicle, wherein the reception of each sample of the third plurality is followed by a waiting period during which samples are not received;
determine, in response to determining that the predetermined threshold percentage has been reached, a third range result for each sample of the third plurality of samples of radar returns by performing FFT on each sample;
write, beginning with the empty portion of the data cube, the third plurality of range results for each sample of the second plurality of samples of radar returns to the data cube, wherein the processor writes each range result to the data cube horizontally; and
read, during the waiting period between samples, the remaining portion of the second plurality of range results written to the data cube, wherein the processor continues to read the remainder of the second plurality of range results in the data cube horizontally and empties the range results from the data cube after they are read.

9. The non-transitory computer-readable storage media of claim 8, wherein the instructions, when executed, further cause the processor to perform the steps performed during the first look period and the second look period for each successive look period in an alternating fashion.

10. The non-transitory computer-readable storage media of claim 8, wherein the instructions, when executed, further cause the processor to perform the steps performed during the second look period and the third look period for each successive look period in an alternating fashion.

11. A method for radar signal processing in a vehicle, comprising:
maintaining, in a memory of a radar system, a data cube of sufficient size to store processed radar data obtained for a single look period;
performing, by the radar system and during a first look period, the following steps:
receiving, by the radar system, a first plurality of samples of radar returns corresponding to a first plurality of chirps transmitted across multiple channels into an environment outside the vehicle;
determining, by a range estimator of the radar system, a first range result for each sample of the first plurality of samples of radar returns by performing a Fast Fourier Transform (FFT) on each sample;
writing, by the range estimator, the first plurality of range results for each sample of the first plurality of samples of radar returns to the data cube, wherein the range estimator writes each range result to the data cube horizontally; and
reading, by a doppler estimator of the radar system and in response to the range estimator completing the writing step for each sample of the first plurality of samples of radar returns, a portion of the first plurality of range results written to the data cube by the range estimator comprising less than half of the data cube, wherein the doppler estimator reads the first plurality of range results in the data cube vertically and empties the range results from the data cube after they are read;

performing, by the radar system and during a second look period following the first look period, the following steps:

determining, by the radar system, that the doppler estimator has emptied a predetermined threshold percentage of the data cube;

receiving, by the radar system, a second plurality of samples of radar returns corresponding to a second plurality of chirps transmitted across multiple channels into an environment outside the vehicle, wherein the reception of each sample of the second plurality is followed by a waiting period during which the radar system does not receive samples;

determining, by the range estimator of the radar system and in response to determining that the predetermined threshold percentage has been reached, a second range result for each sample of the second plurality of samples of radar returns by performing FFT on each sample;

writing, by the range estimator and beginning with the empty portion of the data cube, the second plurality of range results for each sample of the second plurality of samples of radar returns to the data cube, wherein the range estimator writes each range result to the data cube vertically; and reading, by the doppler estimator and during the waiting period between samples when the radar system is not receiving samples, the remaining portion of the first plurality of range results written to the data cube by the range estimator, wherein the doppler estimator continues to read the remainder of the first plurality of range results in the data cube vertically and empties the range results from the data cube after they are read; and outputting, from the radar system, an indication of the data cube for use by a function of the vehicle.

12. The method of claim 11, further comprising:
applying other radar functions to the data cube during the waiting period between samples when the radar system is not receiving samples.

13. The method of claim 12, wherein applying other radar functions to the data cube comprises estimating angles or angle of arrivals from the data cube.

14. The method of claim 11, further including performing, by the radar system and during a third look period following the second look period, the following steps:

determining, by the radar system, that the doppler estimator has emptied the predetermined threshold percentage of the data cube;

receiving, by the radar system, a third plurality of samples of radar returns corresponding to a third plurality of chirps transmitted across multiple channels into an environment outside the vehicle, wherein the reception of each sample of the third plurality is followed by a waiting period during which the radar system does not receive samples;

determining, by the range estimator of the radar system and in response to determining that the predetermined threshold percentage has been reached, a third range result for each sample of the third plurality of samples of radar returns by performing FFT on each sample;

writing, by the range estimator and beginning with the empty portion of the data cube, the third plurality of range results for each sample of the second plurality of samples of radar returns to the data cube, wherein the range estimator writes each range result to the data cube horizontally; and reading, by the doppler estimator and during the waiting period between samples when the radar system is not receiving samples, the remaining portion of the second plurality of range results written to the data cube by the range estimator, wherein the doppler estimator continues to read the remainder of the second plurality of range results in the data cube horizontally and empties the range results from the data cube after they are read.

15. The method of claim 11, wherein the steps performed during the first look period and the second look period are performed for each successive look period in an alternating fashion.

16. The method of claim 14, wherein the steps performed during the second look period and the third look period are performed for each successive look period in an alternating fashion.

* * * * *